US006930931B2

(12) United States Patent
Matsuo

(10) Patent No.: US 6,930,931 B2
(45) Date of Patent: Aug. 16, 2005

(54) PROGRAM COUNTER CIRCUIT

(75) Inventor: Yukikazu Matsuo, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 206 days.

(21) Appl. No.: 10/394,268

(22) Filed: Mar. 24, 2003

(65) Prior Publication Data
US 2004/0085824 A1 May 6, 2004

(30) Foreign Application Priority Data
Oct. 30, 2002 (JP) .............................. 2002-316231

(51) Int. Cl.[7] .............................. G11C 7/00; G11C 8/00
(52) U.S. Cl. ............................. 365/189.12; 365/236
(58) Field of Search ....................... 365/189.02, 189.07, 365/189.08, 189.12, 236

(56) References Cited

U.S. PATENT DOCUMENTS

| 4,847,812 | A | * | 7/1989 | Lodhi .......................... 365/236 |
| 4,873,667 | A | * | 10/1989 | Geadah et al. ......... 365/189.07 |
| 5,210,713 | A | * | 5/1993 | Okabayashi ........... 365/189.07 |
| 6,510,489 | B2 | * | 1/2003 | Komoto ................. 365/189.08 |

FOREIGN PATENT DOCUMENTS

| JP | 8-129487 | 5/1996 |
| JP | 10-161899 | 6/1998 |
| JP | 2001-148199 | 5/2001 |

OTHER PUBLICATIONS

U.S. Appl. No. 09/712,246, filed Nov. 15, 2000 (Our Ref.: 49657–875).

* cited by examiner

Primary Examiner—Trong Phan
(74) Attorney, Agent, or Firm—McDermott Will & Emery LLP

(57) ABSTRACT

A program counter circuit is composed of two kinds of registers, a down counter, an up counter, a selector, and a logic circuit. The two kinds of registers hold a pre-jump PC value and a post-jump PC value of a jump that is prescribed by a program. The down counter holds the number of repetitions of a repeat sequence that is prescribed by the program. The up counter holds a PC value that is counted up for each clock pulse. The selector selects, as a PC value to be output next, the post-jump PC value or the value that is held by the up counter. The logic circuit refers to the output value of the program counter and the output values of the registers and the down counter, and generates a signal that instructs the selector what PC value should be selected as the next output value.

5 Claims, 7 Drawing Sheets

*Fig. 4A*
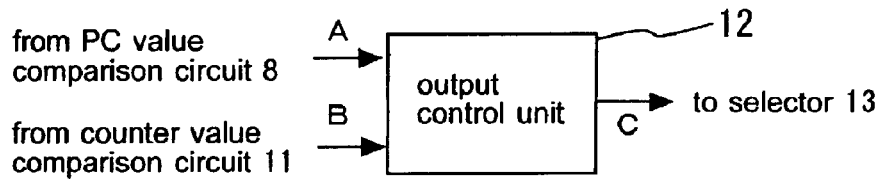
*Fig. 4B*
| A | B | C |
|---|---|---|
| 0 | 0 | 1 |
| 1 | 0 | 0 |
| 0 | 1 | 1 |
| 1 | 1 | 1 |
*Fig. 5*
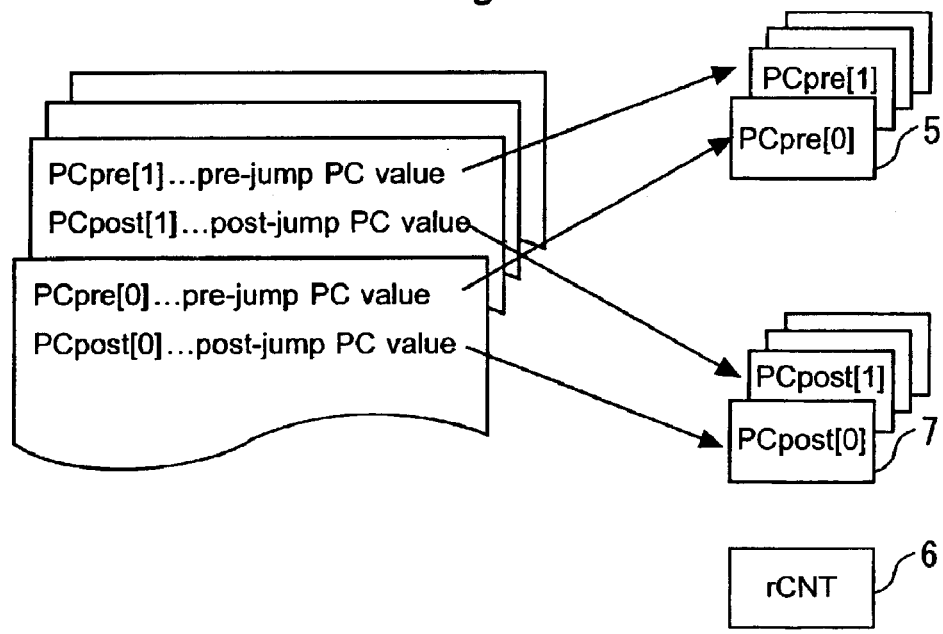

PROGRAM COUNTER CIRCUIT

BACKGROUND OF THE INVENTION

1. Field of the Invention

The present invention relates to a program counter circuit, that is, a circuit that generates, to control the order of execution of a group of instructions, an address indicating a storage location of an arbitrary instruction code that is stored in a storage medium.

2. Background Art

In general, to cause a prescribed circuit to operate according to a prescribed program, a group of instruction codes representing various unit instructions are stored in advance in a storage medium such as a ROM, RAM, or a register. Control is made in such a manner that instruction codes are designated in order that is prescribed by the program and are input to the circuit. Instruction codes are designated by specifying addresses indicating their storage locations. The program counter circuit is a circuit for generating such addresses and outputting those as program counter values (PC values).

Usually, an instruction code contains a PC value of an instruction code to be executed next. Conventional program counter circuits choose one of a first PC value that is counted up one for each clock pulse and a second PC value that is contained in an instruction code that has been executed immediately before, and output it as the next PC value. This enables an operation that while as a general rule instruction codes in a storage medium are executed in order of their storage locations, the storage medium is accessed randomly when necessary such as a jump to an arbitrary instruction code or repeated execution of part of the instruction codes (refer to Japanese Patent Laid-Open No. 161899/1998 (page 5 and FIG. 1)).

However, in conventional program counter circuits, in the case of random access, the steps of outputting a PC value, reading a PC value that is contained in an instruction code that is specified by the output PC value, and outputting it as the next PC value are executed. Therefore, in the case of random access, a delay of one or more clock cycles always occurs as compared to the case of outputting PC values that are produced by simple, one-by-one counting-up.

SUMMARY OF THE INVENTION

An object of the present invention is to provide a program counter circuit having a new configuration capable of solving the above access delay problem.

To solve the above access delay problem, a program counter circuit is provided with an up counter, two kinds of registers, a down counter, a selector, and a logic circuit, and thereby holds, in itself, a pre-jump PC value and a post-jump PC value of a jump that is prescribed by a program and the number of repetitions of a repeat sequence that is prescribed by the program.

The up counter holds, in an initial state, a prescribed initial value of a first PC value, outputs the first PC value for each reference clock pulse, and counts up feedback value of the output first PC value and holds a resulting count-up value. One of the two kinds of registers holds, as a second PC value, the pre-jump PC value and outputs the second PC value for each reference clock pulse. The other register holds, as a third PC value, the post-jump PC value and outputs the third PC value for each reference clock pulse.

The down counter holds a value indicating the number of repetitions, outputs the value for each reference clock pulse, and counts down a feedback value of the output value when receiving a prescribed subtraction instruction signal and holds a resulting count-down value. The selector selects one of the first PC value that is output from the up counter and the third PC value that is output from the post-jump PC register, and outputs the selected PC value as an output PC value of the program counter circuit.

The logic circuit, which is provided between the selector and the up counter, the pre-jump PC register, the post-jump PC register, and the down counter, generates a signal that instructs the selector what PC value should be selected and sends the generated signal to the selector. More specifically, the logic circuit supplies the selector with a signal that instructs the selector to select the third PC value if the output PC value of the selector coincides with the first PC value that is output from the pre-jump PC register and the output value of the down counter is not a value indicating that the number of repetitions is 0, and to select the first PC value in the other cases.

That is, values that are necessary to execute a jump instruction and a repeat instruction that are prescribed by a program are held by the internal registers in advance and a PC value to be output next is generated by using those values. The access delay problem can be solved because the conventional step of waiting for execution of an instruction code and reading a PC value contained therein is eliminated.

Other and further objects, features and advantages of the invention will appear more fully from the following description.

BRIEF DESCRIPTION OF THE DRAWINGS

The present invention will be more apparent from the following detailed description, when taken in conjunction with the accompanying drawings, in which;

FIGS. 4A and 4B are a drawing for explaining a logical operation performed by an output control unit;

FIG. 5 is a drawing for explaining values held by the program counter according to a first embodiment;

DETAILED DESCRIPTION OF THE PREFERRED EMBODIMENTS

A program counter circuit according to the present invention will be hereinafter described in detail with reference to the accompanying drawings. Each of the following two embodiments is such that a program counter circuit according to the invention is applied to an algorithmic pattern generator that generates an arbitrary signal pattern according to a program.

Figure 1A:
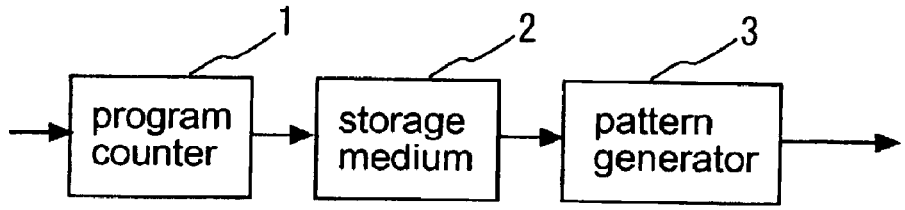
FIG. 1A shows a configuration of an algorithmic pattern generator employing a program counter circuit according to the present invention.

As shown in FIG. 1A, an algorithmic pattern generator is composed of a pattern generator 3 that generates and outputs a pattern signal, a storage medium 2 in which various instruction codes to be given to the pattern generator 3 are stored, and a program counter circuit 1 that generates a PC value indicating a storage location of an instruction code.

Figure 2:
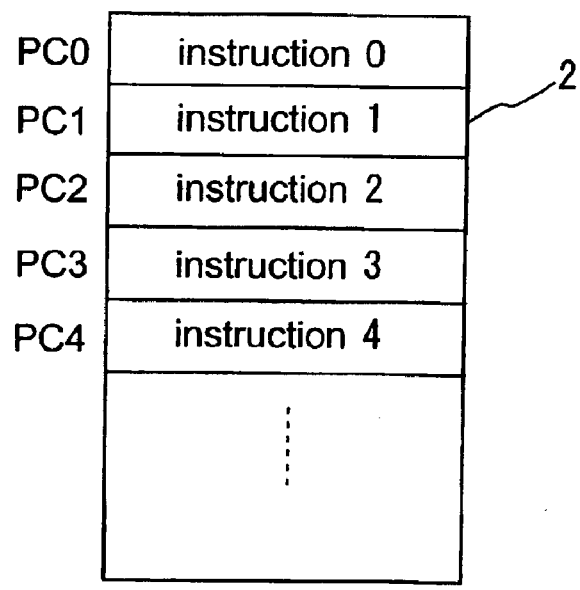
FIG. 2 shows a storage medium storing a plurality of instruction codes.

As shown in FIG. 2, a plurality of instruction codes (instruction 0, instruction 1, instruction 2, instruction 3, instruction 4, etc.) are stored in the storage medium 2. To cause the pattern generator 3 to execute a prescribed instruction, a PC value indicating a storage location (PC0, PC1, PC2, PC3, PC4, etc.) of an instruction code is generated by the program counter circuit 1 and input to the storage medium 2. In response, the instruction code that is stored at the storage located indicated by the PC value is output from the storage medium 2 and input to the pattern generator 3.

Therefore, to cause the pattern generator 3 to execute instructions in order of their storage locations, the program counter circuit 1 outputs PC values such as 0, 1, 2, 3, . . . through one-by-one counting-up.

To cause the pattern generator 3 to execute prescribed instructions repeatedly (repeat function), the program counter circuit 1 outputs the same PC value consecutively only during a period concerned. For example, if it is intended to execute instruction-1 three times and then execute the following instructions, the program counter circuit 1 outputs PC values 0, 1, 1, 1, 2, 3, . . . .

To cause the pattern generator 3 to execute another prescribed instruction after one arbitrary instruction (jump function), the program counter circuit 1 outputs PC values in order of the instructions to be executed. For example, if it is intended to execute instruction-1 to instruction-3 repeatedly, the program counter circuit 1 outputs PC values 1, 2, 3, 1, 2, 3.

Figure 1B:
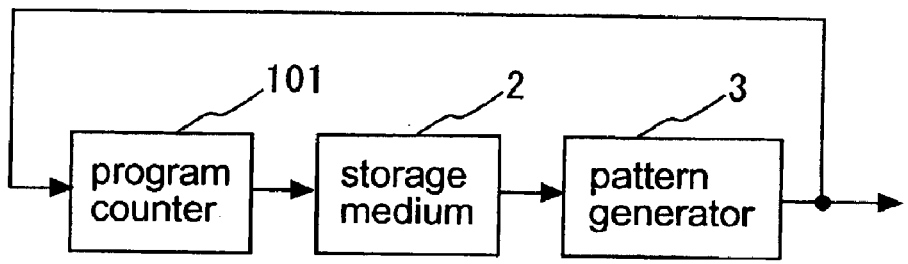
FIG. 1B shows a configuration of an algorithmic pattern generator employing a conventional program counter circuit.

An ordinary algorithmic pattern generator is wired in such manner that, as shown in FIG. 1B, a program counter circuit 101, a storage medium 2, and a pattern generator 3 are connected to each other in cascade and the output of the pattern generator 3 is connected to the input of the program counter circuit 101. This is because, as described above, the conventional program counter circuit 101 realizes the above repeat function or jump function by reading a PC value that is contained in an instruction code and then output the next PC value.

In contrast, where the program counter circuit 1 according to the invention is employed, as shown in FIG. 1A, the algorithmic pattern generator can be constructed by merely connecting the program counter circuit 1, the storage medium 2, and the pattern generator 3 in cascade. This is because the program counter circuit 1 according to the invention does not read a PC value that is contained in an instruction code.

One feature of the program counter circuit according to the invention is that it holds three PC values in itself in advance. In this specification, for convenience of description, the three internal PC values are referred to as "count-up PC value," "pre-jump PC value," and "post-jump PC value." A PC value that is finally output from the program counter circuit is called "output PC value" to discriminate it from the internal PC values.

The count-up PC value is a PC value that is increased one for each clock pulse with a prescribed initial value as a reference. The pre-jump PC value is a PC value that indicates the code of an instruction to be executed immediately before occurrence of jump instruction, that is, immediately before a jump. The post-jump PC value is a PC value that indicates a destination instruction code of a jump that is caused by a jump instruction. In many cases, jump instructions appear at a plurality of positions of a program. Therefore, the program counter circuit may hold a plurality of pre-jump PC values and a plurality of post-jump PC values.

Another feature of the program counter circuit according to the invention is that it holds, in itself, a value indicating the number of repetitions. For example, if it is intended to vary the PC value like 0, 1, 2, 3, 1, 2, 3, 1, 2, 3, 4, 5, that is, if it is intended to repeat a sequence of 1, 2, and 3 three times, the program counter circuit holds values "3," "1," and "3" as a pre-jump PC value, a post-jump PC value, and the number of repetitions, respectively. The value of the number of repetitions is set in a down counter and decreased by one for execution of each repetition. The repetitions are canceled when the value of the number of repetitions has become 0.

The configuration of the program counter circuit 1 according to the invention will be described below in detail.

First Embodiment

Figure 3:
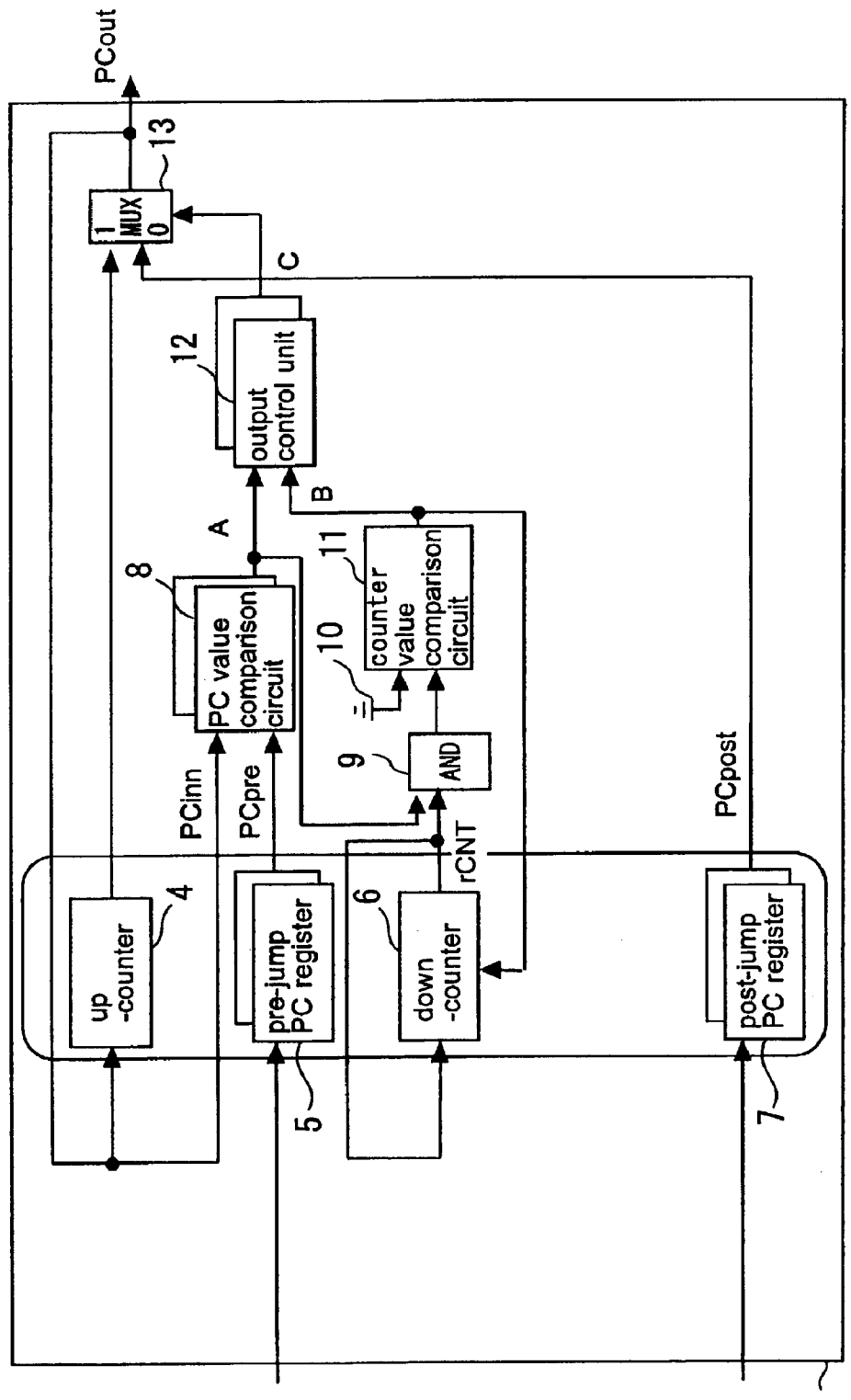
FIG. 3 shows an internal configuration of a program counter circuit according to a first embodiment of the present invention.

FIG. 3 shows the internal configuration of a program counter circuit according to a first embodiment of the invention.

The program counter circuit 1 is provided with an up counter 4 that holds the above-mentioned count-up PC value, a pre-jump PC register 5 that holds the above-mentioned pre-jump PC value, a post-jump PC register 7 that holds the above-mentioned post-jump PC value, and a down counter 6 in which an initial value is set every time it receives a prescribed reset signal and that counts down with prescribed timing one at a time after the setting of the initial value.

Each of the pre-jump PC register 5 and the post-jump PC register 7 is provided with a storage area capable of holding a plurality of PC values. In FIG. 3, this is represented by a plurality of blocks each corresponding to a storage area for one PC value.

The program counter circuit 1 is also provided with a selector 13 that outputs, as an output PC value, one of the output (count-up PC value) of the up counter 4 or he output (post-jump PC value) of the post-jump register 7. As shown in FIG. 3, the selector 13 selects the output of the up counter 4 (i.e., outputs the count-up PC value) if an enable signal has a value "1" and selects the output PCpost of the post-jump PC register 7 (i.e., outputs the post-jump PC value) if the enable signal has a value "0."

The program counter circuit 1 is also provided with PC value comparison circuits 8 that compare the output PCinn of the selector 13 with the output(s) PCpre (pre-jump PC value(s)) of the pre-jump PC register 5 and outputs a first judgment value(s) A indicating whether the two PC values coincide with each other. A plurality of PC value comparison circuits 8 are provided so as to correspond to a plurality of PC values that are held by the pre-jump PC register 5.

The program counter circuit 1 is further provided with an AND circuit that ANDs the output (first judgment value A) of the PC value comparison circuits 8 and the output rCNT of the down counter 6 and a counter value comparison circuit 11 that compares the output of the AND circuit 9 with a prescribed comparison reference value 10 and outputs a second judgment value B indicating whether the two values coincide with each other. The output (second judgment value B) of the counter value comparison circuit 11 is input to the down counter 6 as the above-mentioned reset signal.

The program counter circuit 1 is also provided with output control units 12. The output control units 12 perform a prescribed logical operation on the output (first judgment value A) of the PC value comparison circuits 8 and the output (second judgment value B) of the counter value comparison circuit 11, judge whether the program counter circuit 1 should output the count-up PC value or the post-jump PC value, and output a signal C indicating a judgment result. A plurality of output control units 12 are provided so as to correspond to the plurality of PC value comparison circuits 8. The signal C that is output from the output control units 12 is input to the selector 13 as the enable signal.

The logic of the logical operation is defined so that the output control units 12 outputs the signal C that instructs the selector 13 to select the post-jump PC value if the first judgment value A indicates "coincidence" and the second judgment value B indicates "non-coincidence." In this embodiment, the PC value comparison circuits 8 and the counter value comparison circuit 11 output a value "1" if the judgment result is "coincidence." As described above, the selector 13 outputs the count-up PC value if the enable signal has a value "1" and outputs the post-jump PC value if the enable signal has a value "0."

Therefore, the logical operation that is performed by the output control units 12 should be as shown in FIGS. 4A and 4B. This logic means that the post-jump PC value that is held in advance is output unless the output value of the down counter 6 is "0" at a time point when the pre-jump PC value is output and that the count-up PC value is output if the output value of the down counter 6 is "0." However, it goes without saying that whether coincidence is represented by "0" or "1" is just a matter of design and hence the logic of FIG. 4B is just an example.

A clock (clock signal) is generated by a clock circuit (not shown). The clock circuit may be provided inside the program counter circuit 1. Alternatively, the clock signal may be supplied to the program counter circuit 1 from the clock circuit that is provided outside the program counter circuit 1.

Next, the operation of the program counter circuit 1 will be described. Where the program counter circuit 1 according to this embodiment is employed in the algorithmic pattern generator, it is necessary to set, as initial values, values (PCpre[0], PCpre[1], Cpost[0], Pcpost[1], rCNT) corresponding to jump instructions and repeat instructions in a program in the pre-jump PC value register 5, the post-jump PC value register 7, and the down counter 6 as shown in FIG. 5 in (or before) storing instructions in the storage medium 2.

For example, in the case of a program including a sequence in which instruction-1, instruction-2, and instruction-3 are repeated four times, a sequence that a jump is made to a PC value "1" when the current PC value is "3" will be repeated four times. Therefore, values "3," "1," and "3" are set in the pre-jump PC value register 5, the post-jump PC value register 7, and the down counter 6, respectively. Further, an initial value "0" is set in the up counter 4. In this embodiment, this state is called an initial state (reset state).

Figure 6:
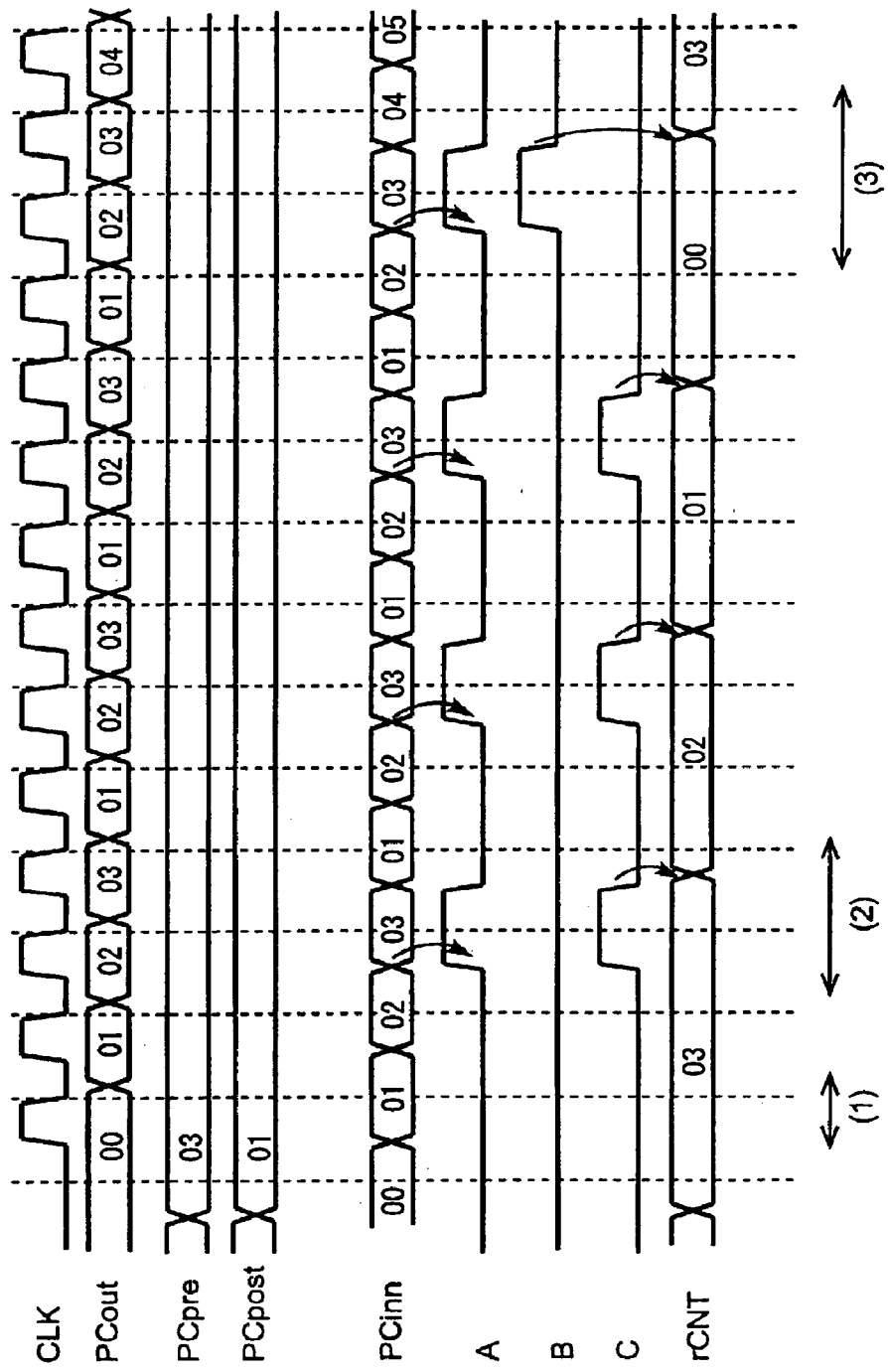
FIG. 6 is a drawing for explaining an operation of the program counter circuit according to a first embodiment.

How the various input/output values and holding values vary after the start of an operation will be described below with reference to a time chart of FIG. 6. In this time chart, a final output PCout of the program counter circuit 1 and an output PCinn of the selector 13 are discriminated from each other. A temporal deviation as shown in FIG. 6 may occur because the output PCinn of the selector 13 is input to a latch circuit or the like to adjust the waveform and the latch circuit outputs the final output PCout.

First, an operation in range (1) in the time chart will be described. In the reset state, the initial value of the count-up PC value that is held by the up counter 4 is "0." In response to the first clock pulse, the up counter 4 counts up and the count-up PC value that is output from the up counter 4 becomes "1." At this time point, the count-up PC value "1" is output as it is as the output PC value. On the other hand, the PC value "1" that is output from the selector 13 is input to the PC value comparison circuits 8 and compared with the value of the pre-jump PC register 5, that is, "3." In this case, the PC value comparison circuits 8 judge that the two values does not coincide with each other (1≠3) and outputs a judgment value A=0.

This judgment value is input to the output control units 12. In this case, as shown in FIG. 4B, the output signal C of the output control unit 12 has a value "1." Therefore, the selector 13 outputs, as the output PC value of the program counter circuit 1, the output value "PC=1" of the up counter 4. Information that this PC value has been output is input to the up counter 4, whereupon the value of the up counter 4 is increased by one.

Next, an operation in range (2) in the time chart will be described. The above operation is repeated for each clock pulse. When the output value of the selector 13 has become "3" and has been input to the PC value comparison circuits 8, the PC value comparison circuits 8 judge that the two values coincide with each other (3=3) and outputs a judgment value A=1, because the pre-jump PC value that is the other input of the PC value comparison circuits 8 is set at "3" as described above. This output is in link with the down counter 6 (not shown). That is, the down counter 6 counts down when the judgment value A has become "1." In the above-described manner, the down counter 6 counts down every time one repetition is completed.

At this time point, the down counter 6 holds the value "3." This value is input to the AND circuit 9. However, since the other input of the AND circuit 9, that is, the output value of the PC value comparison circuits 8, is the judgment value A=1, the value "3" of the down counter 6 is output from the AND circuit 9 as it is as the output value of the AND circuit 9 and then input to the counter value comparison circuit 11. The other input terminal of the counter value comparison circuit 11 is grounded, which means that the comparison reference value 10 of the counter value comparison circuit 11 has a value "0." Since the two input values do not coincide with each other (3≠0), the counter value comparison circuit 11 outputs a judgment value B=0.

At this time point, since the judgment values A and B are "1" and "0," respectively, the output control units 12 output a signal C=0 according to the logic of FIG. 4B. This signal C is input to the selector 13 as an enable signal, and the selector 13 selects and outputs the output value "1" of the post-jump PC register 7. As a result of the above operations, a value "1" is output after the value "3" as the output PC value of the program counter circuit 1. That is, a jump is performed.

At this time, the output value "1" of the selector 13 is also input to the up counter 4, whereby the value of the up counter 4 is set at "1."

Next, an operation in range (3) in the time chart will be described. When the operation in range (2) has been repeated four times, the output value of the down counter 4 becomes "0." In this case, if the same operation as was performed in range (2) is performed in a state that the output value of the selector 13 is "3," the two input values of the counter value comparison circuit 11 coincide with each other and hence the counter value comparison circuit 11 outputs a judgment value B=1. As shown in FIG. 4B, the output signal of the output control units 12 has a value "1." Therefore, in the next clock cycle, the selector 13 selects the output value of the up counter 4. That is, the output PC value becomes "4." The same logical processing is repeated as long as the output value of the down counter 4 remains "0." Therefore, from this time onward, the output value of the program counter circuit 1 varies like 4, 5, 6, . . . . In the above-described manner, the sequence of 1, 2, and 3 is repeated four times and then canceled.

As is apparent from the above description, unlike conventional program counter circuits, the program counter circuit 1 according to this embodiment does not read an instruction code and then refer to a PC value contained therein. Where this program counter circuit 1 is employed in the algorithmic pattern generator, the program counter circuit 1 generates an output PCout using values that are held by the internal registers and supplies it to the storage medium 2 unidirectionally. Therefore, the program counter circuit 1 can operate independently without being affected by the operation states of the storage medium 2 and the pattern generator 3. While the pattern generator 3 executes an instruction that is supplied from the storage medium 2, the program counter circuit 1 can generates the next PC value. Therefore, the program counter circuit 1 provides an advantage in increasing processing speed using pipeline processing and, as a result, makes it possible to construct an algorithmic pattern generator that is higher in performance than conventional ones.

Further, where the program counter circuit 1 according to this embodiment is employed in the algorithmic pattern generator, each instruction code to be stored in the storage medium 2 need not contain PC value information. This makes it possible to shorten instruction codes and thereby save the capacity of the storage medium 2.

Second Embodiment

Next, a program counter circuit according to a second embodiment of the invention will be described. In the above-described program counter circuit 1 according to the first embodiment, the number of repetitions is counted by one down counter. Therefore, the next repeat instruction cannot be executed until the execution of a current repeat instruction is completed. What is called a nesting operation in which a jump-and-repeat sequence includes another jump-and-repeat sequence cannot be realized.

Figure 7:
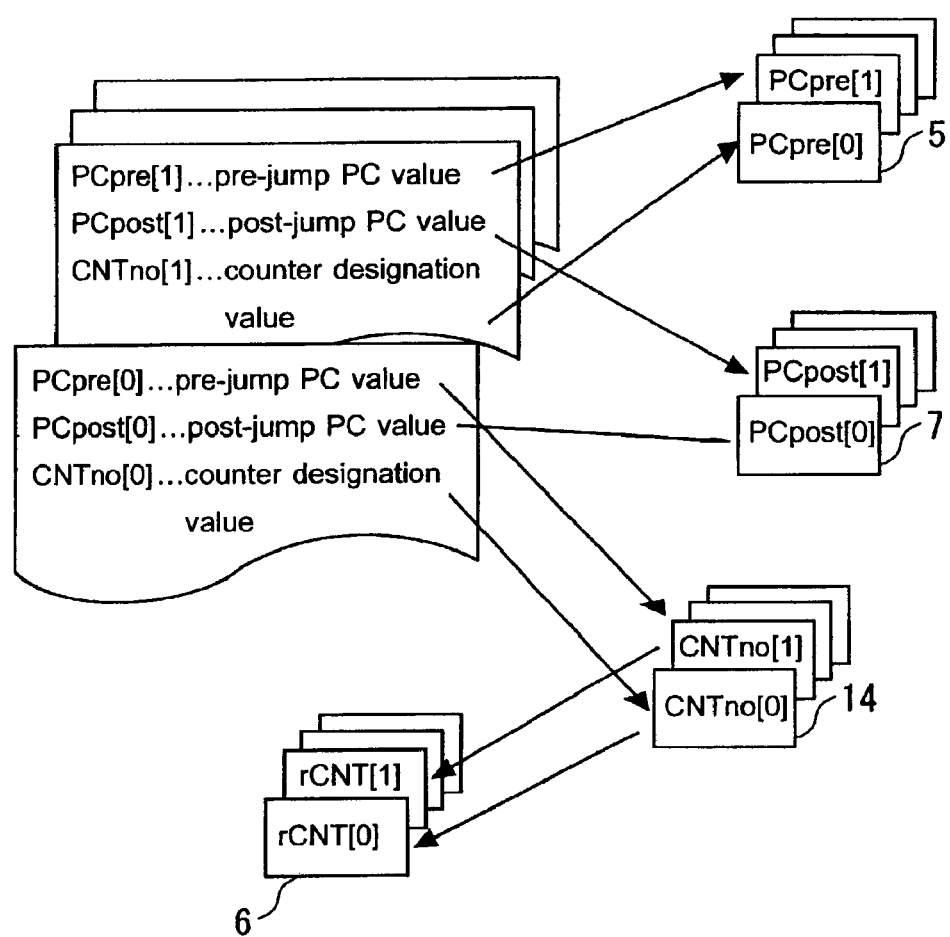
FIG. 7 is a drawing for explaining values held by the program counter according to a second embodiment.

In contrast, the following program counter circuit according to the second embodiment is provided with a plurality of down counters and a plurality of counter designation registers, which together enable execution of nested repeat instructions. In this embodiment, as shown in FIG. 7, different numbers of repetitions are set in the respective down counters 6. A designation value (CNTno[0], CNTno[1]) indicating which of the down counters 6 should be used is set in each counter designation register 14. That is, the number of repetition is not set directly but is set indirectly by designating a down counter in which a desired number of repetitions is set. For example, to refer to the number of repetitions that is set in a second down counter, a value "2" is set in a counter designation register 14.

Figure 8:
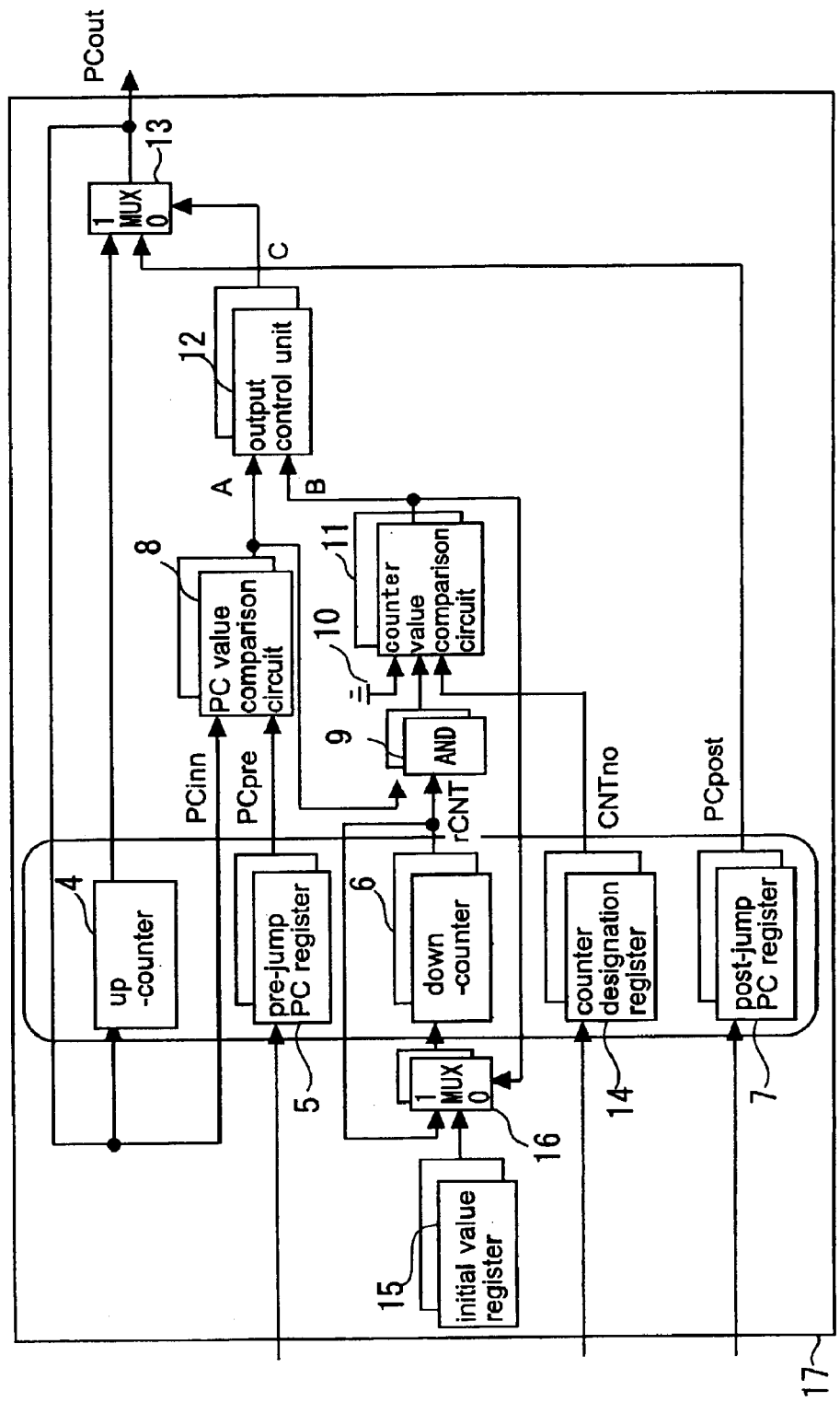
FIG. 8 shows the internal configuration of the program counter circuit 17 according to a second embodiment.

FIG. 8 shows the internal configuration of the program counter circuit 17 according to the second embodiment. Like the program counter circuit 1 according to the first embodiment, program counter circuit 17 is provided with an up counter 4, pre-jump PC register 5, a post-jump PC register 7, AND circuits 9, PC value comparison circuits 8, counter value comparison circuits 11, output control units 12, and a selector 13. The program counter circuit 17 is also provided with the above-mentioned down counters 6 and counter designation registers 14, an initial value register 15 that holds initial values of the down counters 6, and selectors 16 that selectively set output values of the initial value register 15 in the down counters 6. A plurality of AND circuits 9 and a plurality of count value comparison circuits 11 are provided so as to correspond to the plurality of down counters 6.

The outputs of the AND circuits 9 are input to the respective count value comparison circuits 11. The outputs of the counter designation registers 14 are also input to the respective count value comparison circuits 11. As in the case of the first embodiment, the count value comparison circuits 11 are circuits for comparing the outputs of the AND circuits 9 with a comparison reference value 10. However, in this embodiment, the count value comparison circuits 11 refer to inputs from the counter designation registers 14. The count value comparison circuits 11 perform comparison if a down counter 6 concerned is designated by a counter designation register 14 and does not perform comparison if not.

If the value of the down counter 6 has become "0" and the judgment value B that is output from the counter value comparison circuit 11 has become "0," an enable signal value "0" is input to the selector 16. Therefore, the selector 16 selects the output value of the initial value register 15, which is set in the down counter 6 (resetting). On the other hand, the value of the enable signal that is input to the selector 16 remains "1" and the down counter 6 counts down ordinarily until the value of the down counter becomes "0." That is, each of the down counters 6 manages a prescribed number of repetitions that is held by the initial value register 15 and counts down during execution of a repeat instruction. The value of each down counter 6 is reset to the initial value after completion of a repeat instruction.

Figure 9:
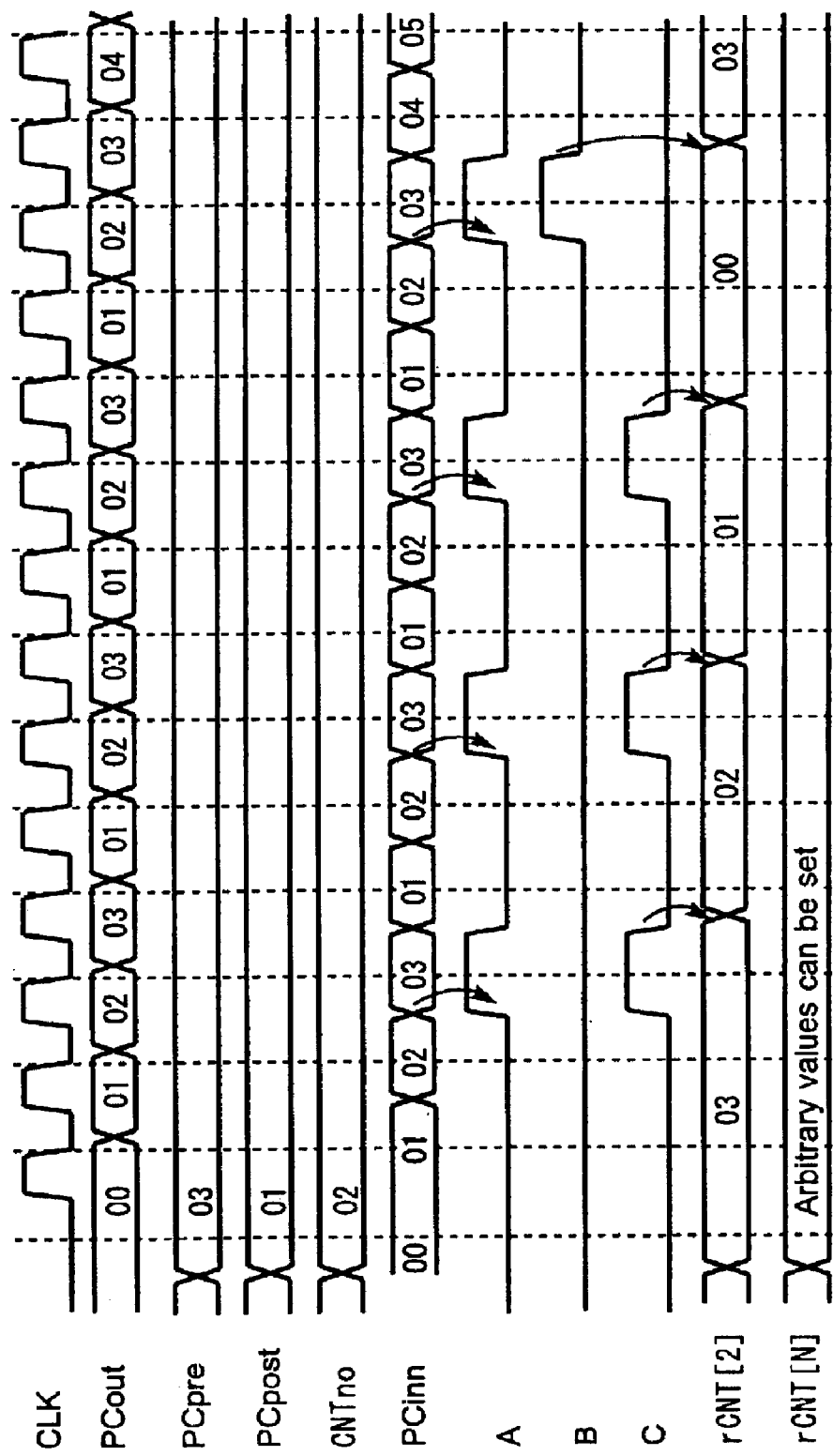
FIG. 9 is a drawing for explaining an operation of the program counter circuit according to a second embodiment.

FIG. 9 is a time chart showing how the various input/output values and holding values of the program counter circuit 17 vary. The example of FIG. 9 is such that the second one of the down counters 6 is designated and the value CNTno of the counter designation register 14 is set at "2." Arbitrary values can be set in the down counters rCNT[N] excluding the second down counter rCNT[2] according to a program.

The program counter circuit 17 according to this embodiment provides the same advantages as the program counter circuit 1 according to the first embodiment. In addition, since the plurality of down counters 6 are provided and can be used selectively through counter designation, what is called a nesting operation in which a jump-and-repeat sequence includes another jump-and-repeat sequence cannot be realized.

Other Embodiments

In program counter circuits according to other embodiments, the program counter circuit 1 according to the first embodiment or the program counter circuit 17 according to the second embodiment is modified partially.

For example, an embodiment is possible in which the down counter 6 is what is called a linear feedback shift register (LFSR) in which flip-flops are connected to each other in series and their outputs are fed back. In this case, it is necessary that an arbitrary one of values that are obtained in a shift be set as the comparison reference value 10 of the counter value comparison circuit 11, and that a value that is produced by a reverse shift from the comparison reference value 10 be determined and set as an initial value of the down counter 6. The use of the LFSR is preferable in that the circuit area can be reduced.

Although in the above embodiments the initial value of the up counter 4 is set at "0," an embodiment is possible in which the initial value of the up counter 4 is set at an arbitrary value. For example, an initial value register and a selector may be provided on the input side of the up counter 4 in the same manner as in the program counter circuit 17 according to the second embodiment (on the input side of the down counters 6). If counting can be started from a PC value other than "0," several programs can be stored in one storage medium and each program can be executed by designating the head instruction.

The program counter circuit according to the invention holds necessary values in itself. Therefore, the program counter circuit can generate the next output PC value irrespective of the execution state of an instruction that is designated by a preceding output PC value. Therefore, the access delay problem of conventional circuits can be solved. Further, since each instruction code need not contain a PC value, codes can be made simpler and the storage capacity can be saved.

It is further understood that the foregoing description is a preferred embodiment of the disclosed circuit and that various changes and modifications may be made in the invention without departing from the spirit and scope thereof.

The entire disclosure of a Japanese Patent Application No.2002-316231, filed on Oct. 30, 2002 including specification, claims drawings and summary, on which the Convention priority of the present application is based, are incorporated herein by reference in its entirety.

What is claimed is:

1. A program counter circuit comprising:
    an up counter for holding, in an initial state, a prescribed initial value of a first PC value, outputting the first PC value for each reference clock pulse, and counting up a feedback value of the output first PC value and holding a resulting count-up value;
    at least one pre-jump PC register for holding, as a second PC value, a pre-jump PC value of a jump that is prescribed by a program, and for outputting the second PC value for each reference clock pulse;
    at least one post-jump register for holding, as a third PC value, a post-jump PC value of the jump, and for outputting the third PC value for each reference clock pulse;
    at least one down counter for holding a value indicating the number of repetitions of a repeat sequence that is prescribed by the program, outputting the value for each reference clock pulse, and counting down a feedback value of the output value when receiving a prescribed subtraction instruction signal and holding a resulting count-down value;
    a selector for selecting one of the first PC value that is output from the up counter and the third PC value that is output from the post-jump PC register, and for outputting the selected PC value as an output PC value of the program counter circuit; and
    a logic circuit coupled to the selector, the up counter, the pre-jump PC register, the post-jump PC register, and the down counter, for providing a logic that causes the selector to select the third PC value if the output PC value of the selector coincides with the first PC value that is output from the pre-jump PC register and the output value of the down counter is not a value indicating that the number of repetitions is 0, and to select the first PC value in the other cases.

2. The program counter circuit according to claim 1, wherein the program counter circuit comprises a plurality of down counters, the program counter circuit further comprising a counter designation register for setting an identifier that indicates desired one of the plurality of down counters.

3. The program counter circuit according to claim 1, wherein the logic circuit comprises:
    a first comparator for comparing the output PC value that is output from the selector with the first PC value that is output from the pre-jump PC register, and for outputting a first judgment value indicating whether the output PC value and the first PC value coincide with each other;
    an AND circuit for ANDing the first judgment value and the output value of the down counter;
    a second comparator for comparing an output of the AND circuit with a prescribed comparison reference value, and for outputting a second judgment value indicating whether the output of the AND circuit coincides with the prescribed comparison reference value; and
    an output control unit that receives the first judgment value and the second judgment value, for sending the selector an instruction signal that instructs the selector to select the third PC value if the first judgment value indicates coincidence and the second judgment value indicates non-coincidence and, in the other cases, sending the selector an instruction signal that instructs the selector to select the first PC value.

4. The program counter circuit according to claim 1, wherein the down counter is a linear feedback shift register.

5. The program counter circuit according to claim 1, further comprising an initial value setting circuit for setting an arbitrary initial value in the up counter.

* * * * *